Sept. 15, 1953     W. B. BARNES     2,651,949
AUTOMATIC TRANSMISSION

Filed July 24, 1946     6 Sheets-Sheet 1

INVENTOR.
WILLIAM B. BARNES
BY
W. P. Hahn
ATTORNEY

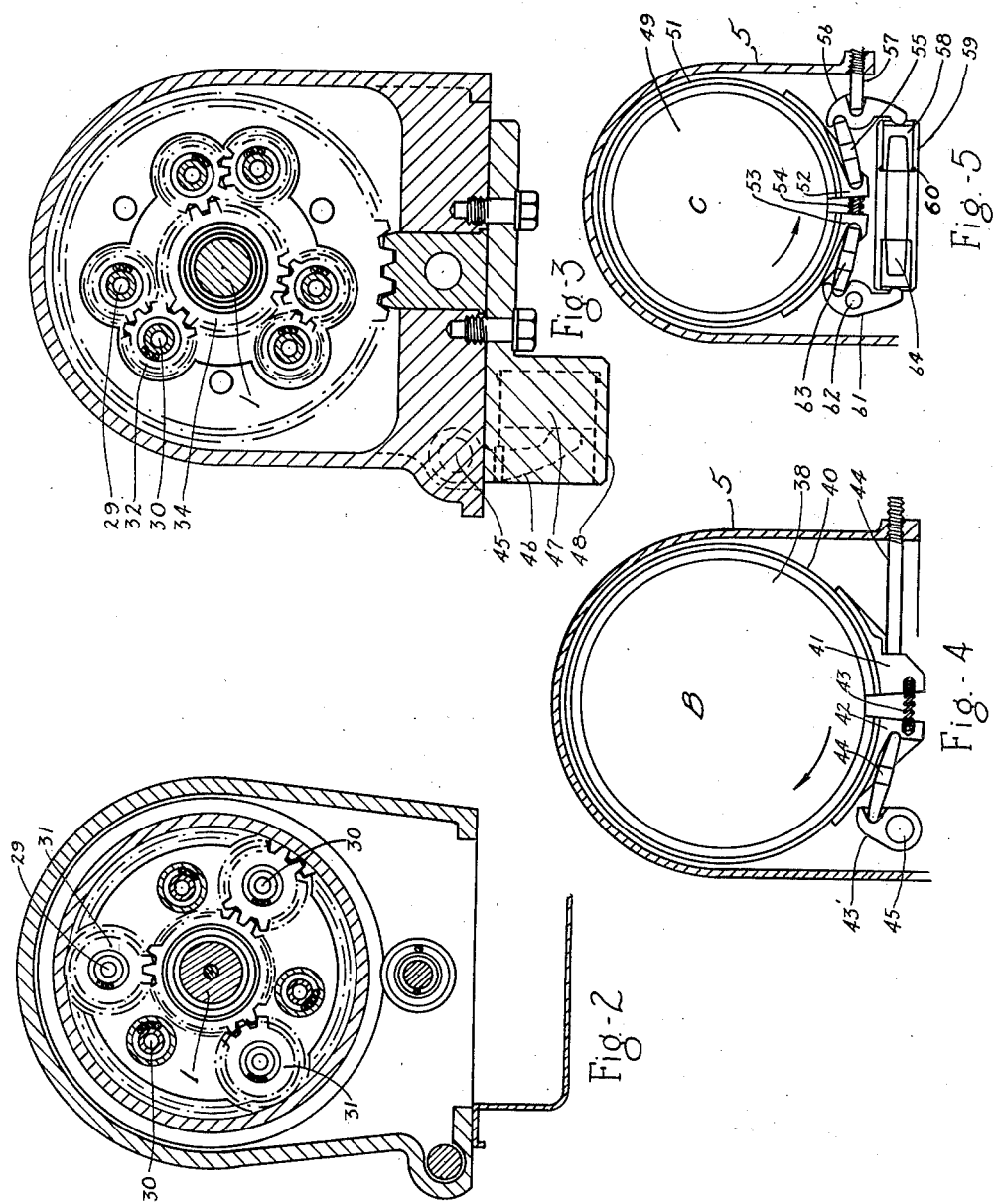

Sept. 15, 1953    W. B. BARNES    2,651,949
AUTOMATIC TRANSMISSION
Filed July 24, 1946    6 Sheets-Sheet 3
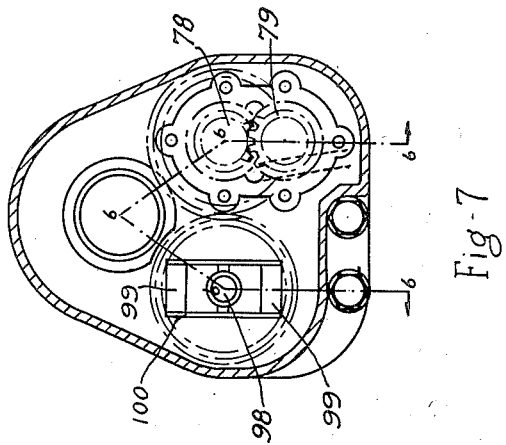
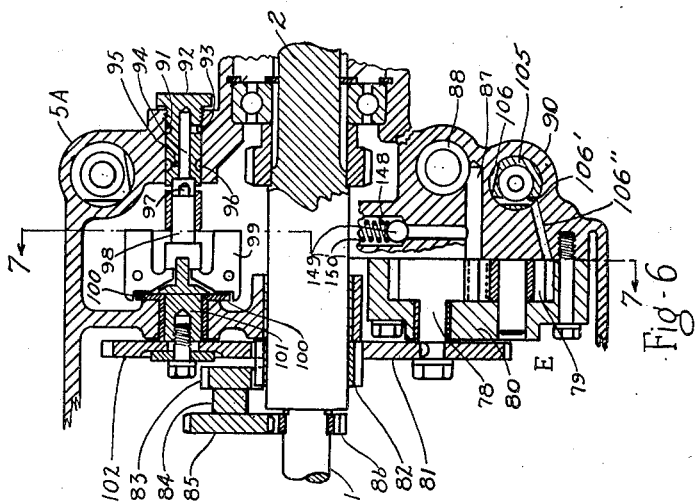
INVENTOR.
WILLIAM B. BARNES
BY
W. P. Hahn
ATTORNEY

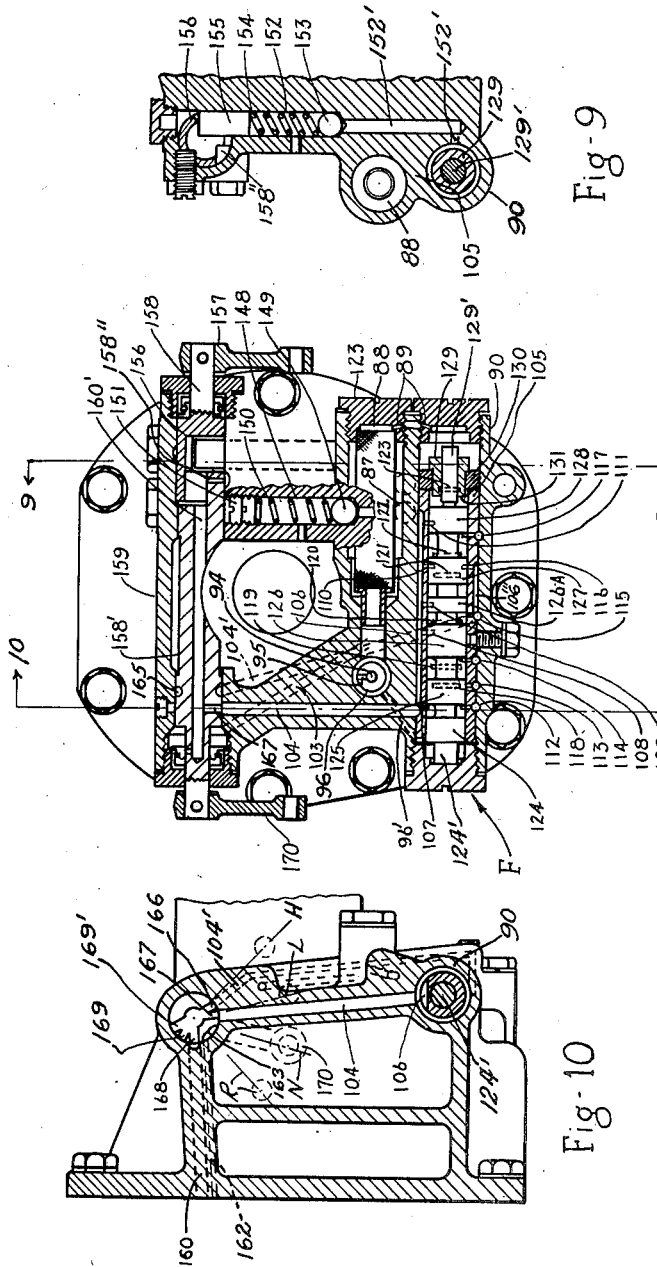

Sept. 15, 1953     W. B. BARNES     2,651,949
AUTOMATIC TRANSMISSION
Filed July 24, 1946                                                       6 Sheets-Sheet 5

INVENTOR.
WILLIAM B. BARNES
BY
W. P. Hahn
ATTORNEY

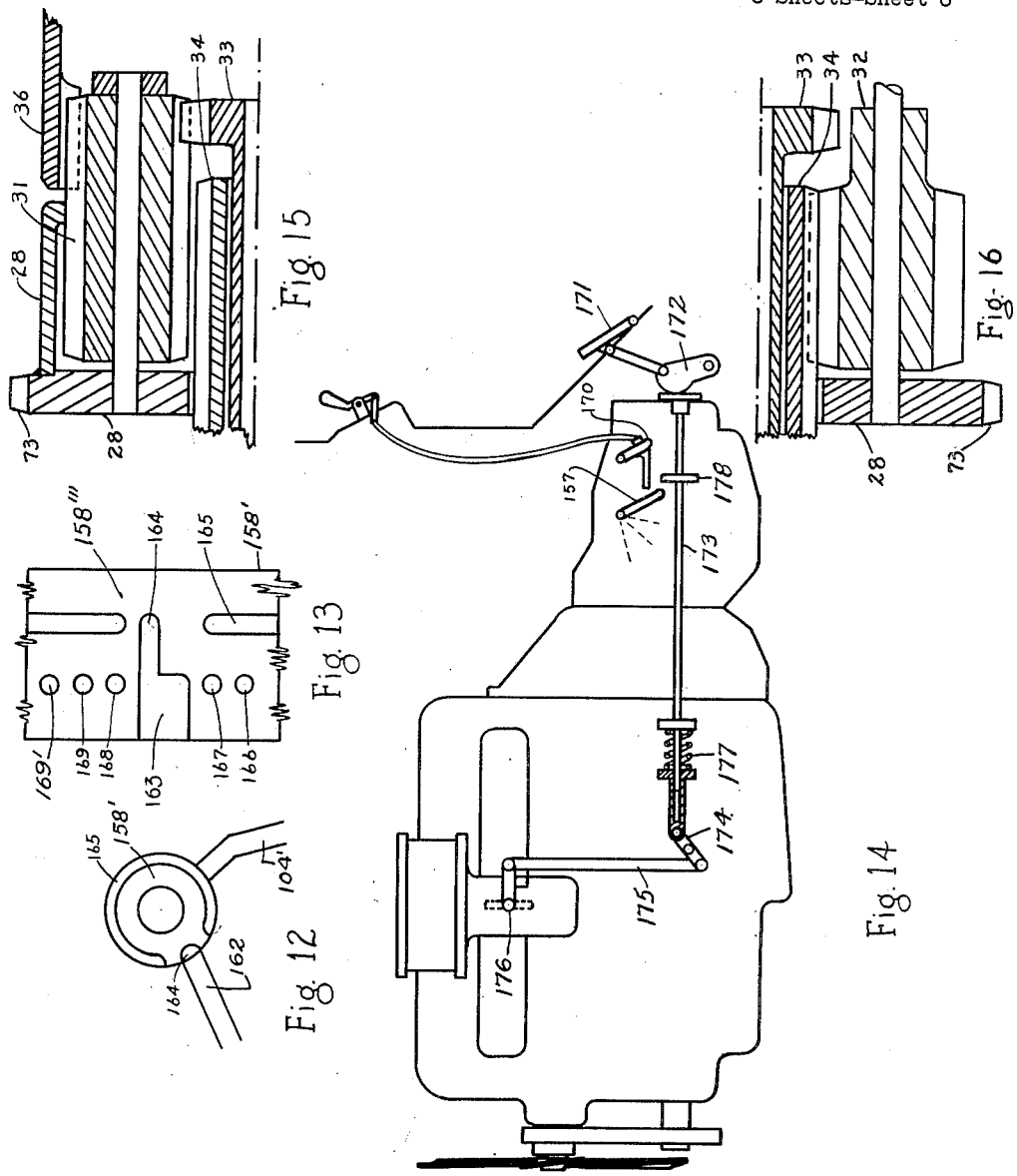

Patented Sept. 15, 1953

2,651,949

UNITED STATES PATENT OFFICE 2,651,949

AUTOMATIC TRANSMISSION

William B. Barnes, Muncie, Ind., assignor, by mesne assignments, of three-fourths to himself and one-fourth to Freda Arthur Barnes, Muncie, Ind.

Application July 24, 1946, Serial No. 685,892

22 Claims. (Cl. 74—752)

The present invention relates to improvements in change speed transmissions, primarily designed for effecting a change speed drive from the power plant to the driving or propelling wheels of a road operating vehicle.

The invention has for one of its objects the provision of an automatically operated speed changing transmission, wherein under normal circumstances, a speed change is effected through various speed changing gears, the speed change being effected automatically from relatively low speed drive to relatively high speed drive through the operation of a governor or governors.

Another object of the invention is to provide a transmission having a series of drive ratios for the driven structure or shaft normally controlled through the operation of an automatic means responsive to the speed of the vehicle but being within the control of the operator, whereby the operator may effect a down shift independently of the automatic means.

A still further object of my invention is to provide an automatically operated transmission, wherein racing of the power plant during the period when a shift is taking place from one speed to another is eliminated.

Another object of the invention is the provision of a driving means for a vehicle, by which the vehicle may, after the driving means has been rendered effective, be started and operated through various speed changes automatically without further manipulation of the transmission control mechanism on the part of the operator.

A further object of the invention is the provision of a governor controlled speed changing transmission gearing, wherein the governor will be selectively operated from the driving or the driven starting means.

Other objects and advantages of my invention will appear more fully hereinafter in the accompanying specification and claims.

For the purpose of disclosing my invention, I have illustrated an embodiment thereof, in which:

Fig. 2 is a sectional view, on the line 2—2 of Fig. 1;

Fig. 3 is a sectional view on the line 3—3 of Fig. 1;

Fig. 4 is a sectional view, more or less diagrammatic on the line 4—4 of Fig. 1;

Fig. 5 is a sectional view, more or less diagrammatic on the line 5—5 of Fig. 1;

Fig. 6 is a detail developed section showing primarily the pump drive for providing fluid pressure and the governor controlling mechanism for controlling said pressure, this figure being taken on the line 6—6 of Fig. 7;

Fig. 7 is a transverse, sectional view taken on the line 7—7 of Fig. 6;

Fig. 8 is a detail section, showing the hydraulic control valve and its associated parts;

Fig. 9 is a sectional view taken on the line 9—9 of Fig. 8;

Fig. 10 is a detail sectional view taken on the line 10—10 of Fig. 8;

Fig. 12 is a schematic sectional view of the manually manipulated control valve;

Fig. 13 is a developed view of the valve shown in Fig. 10;

Fig. 14 is a view, more or less schematic, illustrating the association of the transmission with the power plant and controlling means for the power plant; and Figs. 15 and 16 are detail sectional views of the planetary gear train.

Figure 1:
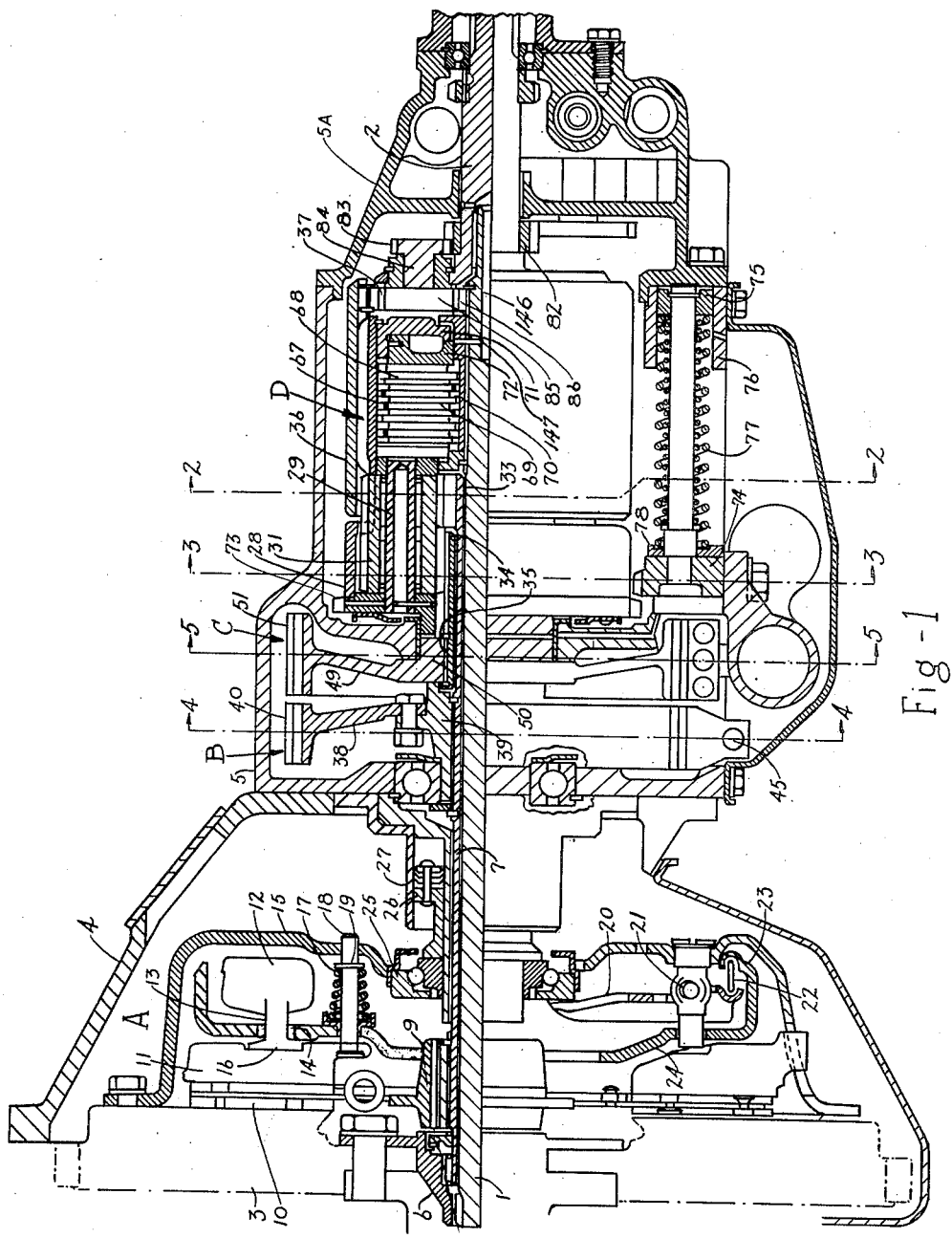
Fig. 1 is a side elevation, partially in section, of a transmission embodying my invention.

In the embodiment of the invention illustrated, I provide a driving shaft 1, which may be driven from any suitable source of power, as for instance an automobile engine or the like, and a driven shaft 2 which is adapted to drive the propelling means of the vehicle. In an automobile, this driven shaft 2 would effect the drive through the differential gearing and rear axle of the vehicle. Associated with and driven from the engine crankshaft is the flywheel 3, the rear face of which is one driving member of a clutch A. The clutch is enclosed in a clutch housing 4 associated with a transmission housing 5. The engine crankshaft is connected to a hub 6 splined or otherwise drivingly secured to the driving shaft 1. The clutch driven member 10 is provided with the usual friction face.

Associated with the clutch driven member 10 is a secondary driving shaft 7 comprising a hollow shaft surrounding the shaft 1. Splined on the secondary shaft 7 is a hub 9 carrying the disk 10. This disk 10 is adapted to cooperate with the flywheel 3 and a driving clutch member or pressure plate 11, and is releasably driven by friction when these latter two members are moved toward one another axially.

Cooperating with the flywheel 3 is the pressure plate 11 between which and the flywheel the driven disk 10 is clamped to provide driving engagement between the parts. The plate 11 is operated through the medium of centrifugally operated governor weights 12 having stems 13 extending through slots 14 of a secondary plate 24 secured to and rotating with the clutch cover 15. The stems 13 are provided with arms 16 which rock against the secondary plate 24 under the movement of the governor weights 12. The pressure plate 11 is biased in a disengaged direction by coiled spring 17 surrounding pins 18 secured to the pressure plate 11. These springs are interposed between the secondary plate 24 and collars 19 on pins 18 to thereby bias the pressure plate 11 in a disengaging position. Secondary plate 24 is biased, with limited travel toward engagement by springs, not shown, interposed between secondary plate 24 and clutch cover 15.

In addition to the governor control for the clutch, I provide a secondary control which is adapted to disengage the clutch, against the action of the governor, under predetermined conditions. To this end, I provide the levers 20 pivoted on pins 21 supported in the cover 15. The outer end of the levers bear on struts 22 interposed between the ends of the levers and the inturned ends 23 of the arms suitably disposed around the outer periphery of secondary plate 24. The inner ends of the levers 20 bear upon a ball thrust bearing 25 operated in one direction by a piston 26 in the cylinder 27.

The speed changing gearing for effecting the various drives is preferably of a planetary type. To this end, I provide a pinion cage 28 having mounted therein on suitably shafts 29 and 30 respectively, long pinions 31 and relatively short pinions 32 (Figs. 2 and 3). The pinions 32 are adapted to mesh with the pinions 31. The long pinions 31 are adapted to mesh with a sun gear 33 which is fixedly secured on the hollow secondary shaft 7. The short pinions 32 are adapted to mesh with a sun gear 34 carried on a sleeve 35 surrounding the secondary shaft 7. In addition to the above described sun gears and planetary pinions, I provide a ring gear 36, which is adapated to mesh with the long pinions 31, and which is secured to a head 37 forming a part of or is secured to the driven shaft 2.

For holding the sun gear 33, which it will be remembered is mounted on the secondary shaft 7, under certain predetermined conditions, I provide a brake B comprising a brake drum 38 secured to a hub 39, in turn splined or otherwise rotatably fixed on the shaft 7. Cooperating with the drum is a stationarily mounted brake band 40, which when contracted holds the drum against rotation. The brake band 40, at its open end, is provided with operating lugs 41 and 42, between which is arranged a biasing spring 43 for normally biasing the band into a disengaged or open position. One lug 41 bears against an adjustable stop 44 secured in the transmission housing 5. The other lug 42 is operated by a lever arm 43', between which and the lug is interposed a strut 44. This lever arm 43' is mounted on a shaft 45, which carries a second lever or arm 46 (see Fig. 3) against which operates a piston 47 in a cylinder 48.

Figure 11:
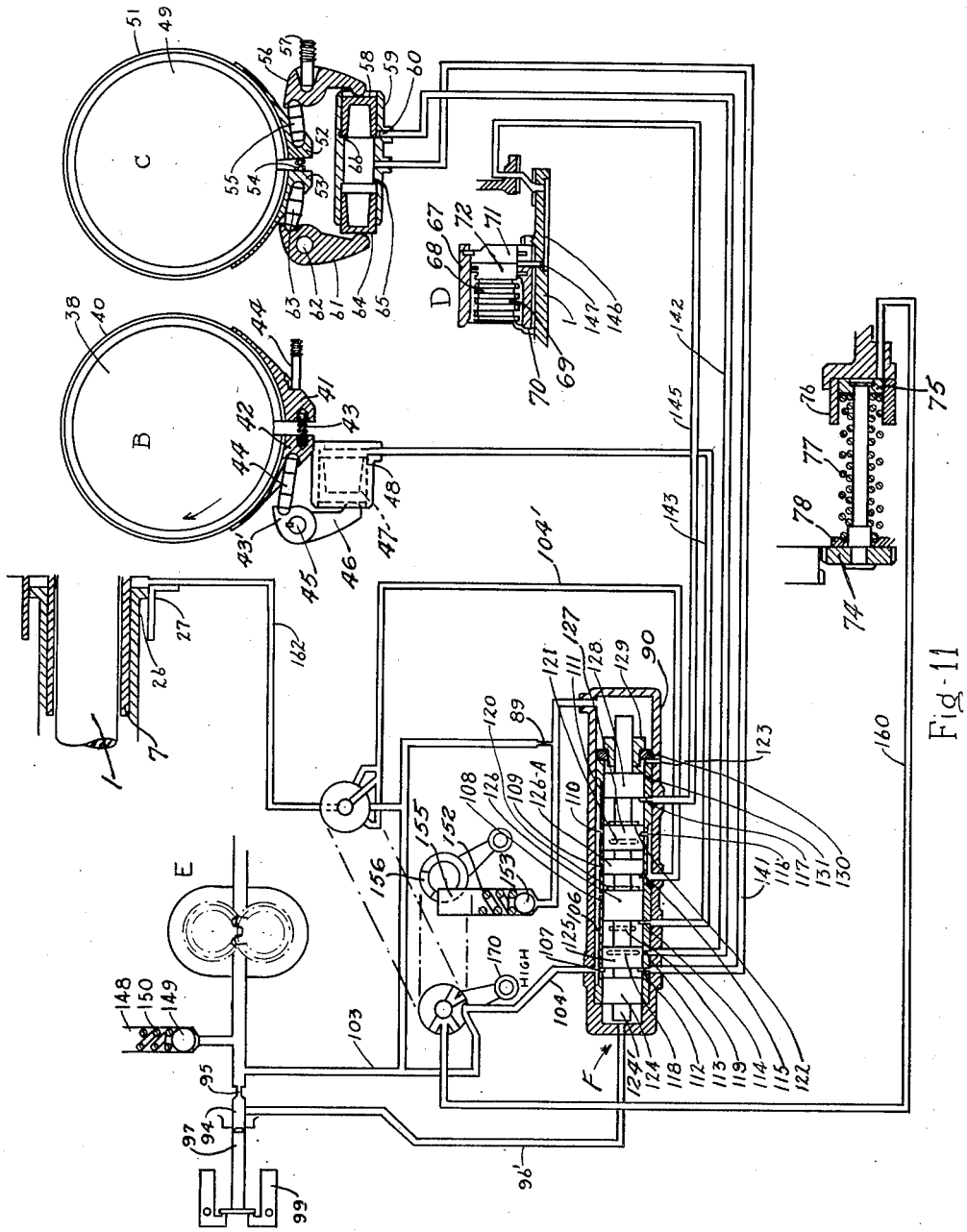
Fig. 11 is a diagrammatic view of the fluid pressure control system.

The sun gear 34, which is carried on the sleeve 35, is controlled by a brake C comprising a brake drum 49 mounted on a hub 50, in turn splined on the sleeve 35. A brake band 51 surrounds the drum 49 and cooperates therewith to hold the drum against rotation under predetermined conditions. The open ends of this brake band 51 are provided with lugs 52 and 53, between which is arranged a spring 54 normally biasing the ends of the band apart, and therefore maintaining the brake band in a released position. The lug 52 supports one end of a strut 55, the opposite end of which operates in a socket in a lever 56 rockably supported on a stationary pin 57 in the transmission housing 5. The opposite end of this lever bears against a piston 58 in a cylinder 59 and this cylinder at the limit of the innermost movement of the piston 58 is provided with an annular groove 60 (Fig. 11), the purpose of which will more fully hereinafter appear. The opposite lug 53 is operated by an operating lever 61 mounted on a shaft 62 and between which lever and the lug 53 is interposed a strut 63. The opposite end of the lever 61 bears against a piston 64 operating in the cylinder 59. The inner movement of the pistons 58 and 64 is limited by shoulders 65 and 66 (Fig. 11).

The pinion cage 28 may be driven from the driving shaft 1 through the medium of a multiple disk clutch D. To this end, I provide a cylinder 67 having a head forming a part of the pinion cage 28. The inner periphery of this cylinder is splined to receive the splined peripheries of pressure disks 68. Operating between the pressure disks 68 are pressure disks 69 having splines cooperating with splines on the inner face of a hub or sleeve 70 surrounding and splined to the shaft 1. The hub 70 and cylinder 67 form a closed cylinder, one end of which is closed by a head 71 and in which operates a piston 72 for applying pressure to frictionally engage the plates 68 and 69.

For effecting a reverse drive, it is necessary that the pinion cage 28 be locked against rotation. To this end, the pinion cage 28 is provided with gear teeth 73 on its periphery and a sliding toothed dog 74 is adapted to engage these teeth under predetermined conditions. This dog is moved into engaging position through the medium of a piston 75 operating in a cylinder 76 and is biased in its disengaged position through the medium of a coiled spring 77 interposed between a stop 78 and the piston 75, so that under normal conditions, the dog 74 is maintained in its unlocking and non-reversing position.

The operation of so much of the apparatus, as heretofore described is as follows: With the clutches A and D disengaged and the brakes B and C released the hub 6 together with the driven shaft 1 are both being driven from the engine without, however, transmitting any drive to the drive shaft.

Assuming that the drive shaft 1 is being driven from a source of power, as for instance the engine of an automobile, the flywheel 3 will be brought up to speed and when the speed reaches a predetermined point the governor weights 12 will move outwardly, and the clutch A will be engaged. This, in turn, will drive the secondary drive shaft 7 driving the sun gear 33. With the brake C previously engaged, thereby holding the sun gear 34 against rotation and in turn, providing a reaction for pinions 32 and their intermeshed long pinions 31, pinion cage 28 will be caused to rotate, effecting the drive between long pinions 31 and the ring gear 36 which will be operated to drive the driven shaft 2 at low forward speed.

If now, clutch A is released, which release may be effected by admitting pressure behind the piston 26, and if at the same time, the clutch D is engaged and the brake C continued in engagement, holding the sun gear 34 against rotation, the pinion cage 28 will be rotatably driven from the shaft 1, but with the intermeshed pinions 31 and 32 reacting through sun gear 34, the ring gear 36 will be driven by pinions 31 and in turn drive the driven shaft 2 at the next higher speed.

If now, both the brakes B and C are released, and the clutches A and D both engaged, the various elements of the planetary gear train will revolve as a unit, thereby establishing a one to one drive, or third speed drive.

In order to obtain what may be termed a fourth speed drive, with the shaft 2 turning at a greater speed than shaft 1, clutch A is released by admitting suitable pressure behind the piston 26, clutch D remains engaged and the brake B is engaged, thereby holding the sun gear 33 against rotation, the reaction through pinions 31 effecting an overspeed drive through the ring gear to the driven shaft 2.

If it be desired to drive shaft 2 in a reverse direction, the locking dog 74 is moved into mesh with the gear teeth 73 on the pinion cage 33, thereby locking the pinion cage against rotation, and if at the same time, the clutch A is engaged, with brakes B and C released, the ring gear 36 will be driven in a reverse direction through gears 33, 31 and 36, thereby driving the shaft 2 in a reverse direction.

It is to be noted that in obtaining the various speeds above described, for the first and second speed drives, the brake C is engaged in holding relation. However, when the shift is made from second speed to third speed drive, the brake C is released and, at the same time, both the clutches A and D are engaged. Under these circumstances, the release of the brake C must be in synchronism with the engagement of the clutch A, as otherwise, if the release is too early, the engine would tend to race and if the release is too late, there will be a tendency for the transmission to be in second and third speeds at the same time. In order to effect this synchronous release of the brake C with the engagement of the clutch A, I take advantage of the change in torque reaction on the brake drum 49, when the shift is made from second to third. During the drive, in second speed, the torque reaction on the drum of the brake C is in the direction of the arrow or counter-clockwise, as shown in Fig. 5 and fluid pressure is being admitted to the cylinder 59. At the same time, due to the torque reaction, the piston 58 is held against the shoulder 66 with the preponderance of pressure actuating to maintain the piston 64 biased in its outward direction away from its shoulder 65. If now, the admission of fluid pressure to cylinder 59 is shut off and at the same time, the torque reaction of the brake drum of the brake C is reversed, as a result of the engagement of clutch A, then there will be a tendency for the piston 64 to move inward toward its shoulder 65 and a tendency for the fluid column within the cylinder 59 to shift the piston 58 away from its shoulder 66. Therefore, as the piston 58 moves away from its shoulder 66, the vent channel 60 is uncovered and the cylinder 59 is immediately vented to the atmosphere.

It is observed that when the shift is to be made into overdrive or fourth speed, the brake drum 39 is actually being rotated and therefore the brake may be said to pick up the fourth speed drive, necessitating a smooth action on the part of the brake. Accordingly, full advantage is taken of the self-deenergizing properties of the brake. As will be observed in Fig. 4, the torque reaction is in the direction of the arrow and accordingly, the tension side on the brake band is on the side actuated by the piston 47 actuated by fluid pressure. Accordingly, the tension side of the brake is then actuated by the piston 47 operating in the cylinder 48 and the engaging properties of the brake are limited by fluid pressure which can be controlled or adjusted to give a smooth pick up.

The operation of the parts, heretofore described, effecting the change speed drive, is effected through fluid pressure controlled by governing means responding to the speed of the driving or driven shafts. The control mechanism is preferably mounted within an extension 5A at the rear of the transmission casing 5.

Within this casing is provided a suitable gear pump E (Fig. 6) comprising the gears 78 and 79 mounted on shafts within the gear pump casing 80. The gear 78 of the gear pump is driven by a gear train, including the gear 81 mounted on the driving shaft of the gear 78 and meshing with the wide gear 82 rotatably mounted on the driven shaft 2. The gear 82 is driven from the gear 83 on a shaft 84, which is mounted in a bearing on the head 37 on the driven shaft 2. This shaft 84 also carries a gear 85 meshing with a gear 86 on the driving shaft 1. This arrangement is such that a pressure supply may be maintained by the pump E during various conditions of operation. If for instance, the vehicle is idle, with the engine running and driving shaft 1, the gear 86, driving the gear 85, will drive the pump through the gear train 83, 82 and 81. If, however, the engine is not operated and accordingly, the shaft 1 is not being driven and if at the same time, the vehicle is moving, driving the shaft 2, this shaft will drive the head 37 in turn causing the gear 83 to rotate by planetary action and drive the pump through the gear train 82 and 81. Therefore, a fluid pressure may be supplied, even though the engine should not be operating.

The gear pump E is supplied with oil or other suitable liquid, preferably from a sump in the casing 5A. The gear pump E supplies oil under pressure through a suitable conduit 87, to a pressure chamber 88. This chamber 88 communicates by a suitable restricted passage 89 with one end of a control valve cylinder 90. The chamber 88 also communicates with an annular channel 91, in a hollow plug 92 in the casing (Fig. 6), which channel in turn communicates by a port 93 with a passage 94 in the plug 92. This passage 94 in turn communicates through the port 95 and annular channel 96 with the left-hand end (Figs. 8 and 11) of the control valve cylinder 90 by way of a restricted passage 96' (Fig. 8). The escape of pressure in the passage 94 is controlled by a governor controlled valve 97 secured on the stem 98 adapted to be engaged by the arms of bell crank governor weights 99. These governor weights are suitably pivoted between the sides of the frame 100, carried on and rotating with a shaft 101, which shaft carries a gear 102 meshing with and driven from the gear 82. Accordingly, the governor will be driven either when the vehicle is idle and the engine is driving the driving shaft 1 with the clutch A disengaged, or when the engine and vehicle are moving, or when the engine is idle and the driven shaft 2 is being driven from the driving wheels of the vehicle when the vehicle is coasting or being pushed.

The valve cylinder 90 (Figs. 8 and 11) and its associated valve member provide a control valve F for controlling the admission of fluid pressure, delivered by the pump E, to the various fluid pressure operated parts of the transmission. To this end, fluid under pressure from pump E is admitted to the valve cylinder by way of the pressure chamber 88, passage 103 and passages 104, leading to and from a hand-controlled valve to be more fully hereinafter described. The valve cylinder 90 is provided with a liner 105 between the periphery of which and the cylinder wall proper is provided a passageway 106 communicating with the inlet passage 104. A second passage 106' is formed between the liner 105 and the wall of the valve cylinder 90 (Fig. 8). This passageway vents by way of passageway 106" to the pump E or if desired to the sump of the casing. A third passage 106'" is formed between the wall of the cylinder 90 (Fig. 8) and the liner 105 and this passageway communicates by a passageway 104' with the casing of the hand valve to be hereinafter described.

Suitable inlet ports 107, 108, 109, 110 and 111 in the liner 105 extend from the passageway 106 to the interior of the liner. Outlet ports 112, 113, 114, 115, 116 and 117, communicating with the different fluid pressure operated parts of the transmission by suitable conduits or passages, are provided in the liner 105 and cylinder 90. Pressure escape ports 118, 119, 120, 121, 122, and 123 are provided in the liner 105 and cylinder 90 (Fig. 8) for venting the different pressure controlled parts of the transmission, as control of the operation of the transmission demands. These escape ports 118 to 123 communicate with passageway 106' which in turn communicates by passageway 106" with the intake side of the pump E or if desired with the oil sump (not shown). These various ports are controlled by a valve comprising a stem 124' carrying a plurality of valve lands 124, 125, 126, 126A, 127 and 128. Surrounding one end of the stem is a floating stop comprising a piston 129 and a secondary piston 130 which surrounds the hub 131 of the primary piston 129. These two pistons are subject to hydraulic pressure admitted through the passageways 89 to the valve cylinder. Pressure for moving the valve stem 124' and its associated lands to the right for the purpose of controlling the admission of pressure to or the escape of pressure from the various clutch and brake operating means is admitted by the way of passage 96' to the left-hand end of the cylinder 90. This pressure is varied in accordance with the action of the governor controlled valve 97 and therefore, increases if the governor controlled valve 97 tends to close. It is to be understood that the pressure developed by the pump E is substantially constant. Constant pressure from the pump E is delivered to the right-hand end of the cylinder 90 through the passage 89. With pressure admitted to the left-hand end of the cylinder 90 this pressure acts upon the left-hand side of the land 124 and when this pressure becomes sufficiently great to overcome the pressure acting in the right-hand end of the cylinder 90, against the sliding piston 129' the valve stem 124' will be caused to be moved to the right and this movement will continue until the land 128 abuts against the hub 131 of the piston 129. This increases the effective area against which the constant pressure in the right-hand end of the cylinder exerts in opposition to the pressure exerted against the land 124 and the end of the stem 124' at the left-hand side of cylinder 90. Accordingly the effective pressures on each side of the valve stem are equal and the valve stem comes to rest. As the pressure is increased on the left-hand side of the cylinder 90, under the action of the governor controlled valve 97, this pressure will unbalance the pressures at either end of the cylinder 90 to the extent that the valve stem and its associated parts will be moved further to right, looking at Fig. 8, until the land 131 engages the piston 130. When this happens the effective area against which the constant pressure in the right-hand end of the cylinder 90 is increased and as a result of this increased area the effective pressure exerted against the right-hand end of the valve stem counter-balances the effective pressure on the right-hand end of the valve stem and again the valve stem and its associated parts come to rest. Again as the pressure in the left-hand end of the cylinder 90 is increased as the result of the operation of the governor controlled valve 97 this pressure will overcome the counterbalancing pressure in the right-hand end of the cylinder and the valve stem 124' and its associated parts will be moved further to the right until eventually the sliding piston 129' abuts against the end wall of the cylinder and the parts come to rest and remain in this position.

Referring to the diagrammatic view, Fig. 11, the outlet port 112 communicates through a suitable conduit 141, in the casing, with the cylinder 58 of the bracket C. The outlet port 113 communicates through a suitable conduit 142 with the escape channel 60 in said cylinder 59. The outlet port 114 communicates through a suitable conduit 143 with the cylinder 48 controlling the brake B. The outlet ports 115 and 116, through a passage 106'", passage 104' and through the hand valve 158' and 159 (to be later described), and passage 162 communicate with the cylinder 27 controlling the clutch A. The port 117 communicates through a suitable conduit 145 with a passageway 146 in the end of the driving shaft 1, which passageway in turn communicates through the passageway 147 to the interior of the cylinder 67 whereby the clutch D is controlled.

For maintaining the pressure delivered by the pump constant, so that fluctuations in the pressure resulting from speed variations, etc. of the vehicle will not effect the predetermined action of the governor weights 99 and the valve 97 controlled thereby, I provide a pressure regulator valve, which comprises a relief chamber 148 communicating with the passage 87 of the pump. Entry to this relief chamber is controlled by a ball valve 149 biased in its closed position by coil spring 150 abutting an adjustable screw stop 151 (Fig. 8). The pressure of the spring 150 may be adjusted to maintain the valve 149 closed under normal conditions. If, however, there is a surge of hydraulic pressure or if the hydraulic pressure climbs beyond the predetermined point for any purpose, the ball valve 149 will open, releasing the pressure in the passage 87 until the pressure returns to normal, when under the influence of the spring 150 the ball valve 149 will again close.

For modifying the differential pressure against the floating pistons 129', 129 and 130 and against the land 128, I provide what may be termed a range control valve, which acts to control the oil pressure acting upon these floating stops 130 and 131. This valve comprises an escape chamber 152 communicating by way of passage 152' with the end of the cylinder 90 beyond the floating stops 130 and 131. Normally, the passage 152' connecting the chamber 152 with the valve cylinder 90 is maintained closed by a ball valve 153 seated under the action of a coiled spring 154 abutting against an adjustable stop 155. Thus, by the movement of the stop 155, the tension of the spring 154 may be modified. This adjustable stop 155 is manipulated by a rotating cam 156 adapted to engage the stop. This cam is manipulated by an operating lever 157 on the shaft 158 of the cam and the lever 157 may be operated by a hand-controlled operating mechanism or by an operating mechanism responsive to the operation of the throttle control member of the vehicle, the arrangement being such that the lever 157 will not be operated by the throttle control member, until the throttle control member has passed wide open throttle position (see Fig. 14). After the throttle control member has passed the wide open throttle position and operates lever 157, the tension of the spring may be increased to such an extent that the differential pressure is developed against pistons 129', 129 and 130 of the valve F to move the valve to the left, irrespective of the position of the governor weights 99 and valve 97, and thus effect a change of gear ratio downward from that normally determined by the speed of the car. The hand valve member 158' is provided with an extension or lug 158'' which projects in the path of the cam 156 but in such position that there is a certain amount of lost motion in the rotation of the valve 158' before the projection 158'' will engage the cam 156. However when the hand valve is rotated by lever 170, under certain conditions, and engages the cam 156 it will operate on the stop 155 in the same manner as if the cam 156 were rotated by the lever 157. In addition to the automatic hydraulic control for effecting the shift from one speed to another, I provide a manual control for placing a transmission in reverse drive and for placing the controls in neutral, so that no shift may take place. In addition, the hand-control provides an arrangement whereby the control mechanism may be set for what may be termed low speed. This is advantageous in event the vehicle is travelling down hill and the engine is relied on for its braking effect. Therefore, the hand-control may be so set for low that the transmission is thus continuously in lower range of speeds than would be ordinarily determined by the speed of the car. Furthermore the hand valve including valve 158' and casing 159 cooperates with the automatic control valve F to effect the automatic control of the transmission in a manner to be more fully described hereinafter.

To this end, I provide a hand valve 158' operating in the valve casing 159. The casing communicates by a passage 103 with the pressure cylinder 88 and by a passageway 104 with the passage 106 in the valve casing 90 for delivering actuating pressure to the valve F and from the valve F to the pressure actuated parts of the transmission.

The casing likewise has a passage 160 communicating with the cylinder 76 controlling the reverse dog. The passage 104' communicating with the outlet passage 106' communicates with the valve casing 159 and leading from this valve casing is a second passageway 162 leading to the cylinder 27 controlling the clutch A.

The valve member 158' is provided on its cylindrical face 158''' with a widened passageway 163 (Fig. 13) extending into a narrow passageway 164. The passageway 163 under certain predetermined conditions, is adapted to place passageways 103 and 104 in communication with one another and the narrow portion 164, under certain conditions, is adapted to place passageway 103 in communication with the passageway 104'. Also formed around the periphery of the valve member 158' is an annular groove or passageway 165, which under certain predetermined conditions will connect passages 104' and 162.

In addition to the passageways 163 and 165 in the face of the valve member 158', I also provide a series of ports 166, 167, 168, and 169 extending from the face of the valve member radially inwardly to communicate with the passageway 160'.

In operation it will be assumed that the hand lever 170 controlling the valve member 158' has been moved to the position indicated as "high" (Fig. 11). This position does not correspond exactly to the position of the parts shown in Figs. 8, 9, and 10 because in those figures the parts are shown with the valve lever 170 at the neutral position. It will also be assumed that the engine is running and accordingly the pump E is being driven and therefore, is operating to deliver oil under pressure to the various parts. With the valve member 158' rotated to the "high" position the groove or passageway 165 is in a position to place passageways 162 and 104' in communication with one another. Passageway 162, it will be remembered, leads from the cylinder 27. Passageway 104' leads to the passageway 106''' in the casing of valve E which passageway communicates through the ports 115 and 116 with the interior of the valve casing 90 and the valve casing communicates through port 120 with the passageway 106' which in turn vents through the passageway 106''. Accordingly the cylinder 27 is vented and no pressure therefore, exists in this cylinder. Therefore, there is no pressure exerted to prevent the centrifugal weights 12 from operating to engage clutch A.

With the valve member 158' rotated to the "high" position, passageway 163 in said valve places passages 103 in communication with the passageway 104 and accordingly oil pressure is delivered to the passageway 106. However, under these conditions, oil under pressure is being delivered by the restricted passageway 96' to the left hand end of the cylinder 90. The pressure of this oil however is not sufficiently great to, at this moment, move the valve stem 124' and its associated parts to the right because the valve 97 has not been sufficiently closed. Pressure, therefore, from the pressure cylinder 88 passes by the way of passages 103, 163 and 104 to passage 106. Mention may be made at this point that in the diagrammatic view the pressure cylinder 88 has not been illustrated. From the passage 106 the oil pressure will pass through port 107 in the liner 90 to the interior of the liner and as the valve stem 124' is at its extreme left-hand position this pressure will pass out of the liner through port 112 and thence by conduit 141 to fluid pressure cylinder 59 thereby operating the pistons 58 and 64 to contract the brake band 51 and thus lock the brake C. With the brake C locked the sun gear 34 is held against rotation and with sun gear 33 rotating under the drive of shaft 1 the vehicle will move forward at first speed in a manner heretofore described.

With the valve stem 124 and its associated parts in its extreme left-hand position it is also to be noted that port 114 is in communication with the interior of the valve casing 90 and that vent port 119 is uncovered which vent port is in communication with passageway 106' which in turn vents to the intake side of the pump E. Accordingly the cylinder 48 is vented and brake band 40 is in a released condition.

As now the speed of the engine is further increased by the usual accelerator pedal control the speed of the governor will be increased and with the outward movement of the weights 99 the valve 97 will be moved further toward closed position thus partly shutting off the escape of pressure through the port or passage 94. This causes an increased pressure flow from the pressure cylinder 88 through the passageway 96' into the left-hand side of the cylinder 90 thereby increasing the pressure on the valve stem 124' and land 124 thus moving the valve stem and its associated lands further to the right to its second position.

By the time the valve stem 124' and its associated parts has been moved to its second position to the right the valve land 128 will engage the hub of the piston 129 increasing the area against which the pressure in the right-hand side of the cylinder is exerted. With this increased area the effective pressure on the right-hand side of the valve stem balances the pressure exerted on the right-hand side of the valve stem and as a result the valve stem and its associated lands will be brought to rest in this its second position.

This position while still permitting port 112 to be in communication with the interior of the cylinder 90 and, therefore, permitting the passage of pressure to cylinder 59 to thus maintain the brake band 51 engaged and accordingly the sun gear 33 held stationary, moves the land 126 to a position to still vent cylinder 48 by the way of port 114 and escape port 119 to the passageway 106' and thus by way of passageway 106'' to the intake side of the pump E. The land 126 however, closes the vent port 120 and the land 127 blocks the vent port 121 so that the venting of cylinder 27 by the way of passages 162, groove 165 in valve member 158' and passageway 104, is shut off. At the same time port 109 is open so that operating pressure from the pump which is being delivered by passageways 103 and 104 to passageway 106 passes through port 109 into the cylinder 90 and thence by port 115 into passageway 106''' and from thence by passageway 104' and passageway 162 to cylinder 27. This effects a disengagement of clutch A. At the same time land 128 has been moved to position to open port 117. Therefore, pressure which is admitted to the interior of the cylinder through port 111 from the passageway 106 passes out through port 117 and by conduit (Fig. 11) 145 to clutch D. Therefore, clutch D is engaged and with clutch D engaged and with clutch A disengaged and brake B disengaged, second speed is established in the manner heretofore described.

As the speed of the engine is increased by further manipulation of the accelerator pedal the governor weights 99 will move further outwardly thereby moving the valve 97 further toward its closed position to further restrict the escape of oil from the passageway 94. As a result increased oil pressure will be delivered from the pressure chamber 88 through the passage 96' to the left-hand end of the valve cylinder 90. This increased pressure acting against the end of the valve stem 124' and against the land 124 moves the valve stem and its associated lands to the right and to its third position. This rightward movement of the stem 124' and its associated lands continues until the land 128 engages the floating piston 130. This piston is of greater diameter than piston 129 but the combined area of pistons 129', 129 and 130 is such that though the fluid pressure in the right-hand end of cylinder 90 is the same the effective pressure is increased due to the increased area on which the pressure in cylinder 90 is operated. Therefore, a pressure balance is established between the pressures exerted to move the valve stem 124' to the right and the pressure exerted to move the valve stem 124' to the left, thus the valve stem and its associated parts is again brought to rest in its third operating position.

With the valve stem in its third operating position the land 124 is moved to a position whereby the inlet port 107 leading from the passage 106 is closed. Therefore, no operating pressure, which is being delivered to passage 104 and passage 106, will be delivered to the interior of the cylinder 90 and to the interior of the cylinder 90 at a point where it can pass out of port 112, so that pressure by the way of conduit 141 to the cylinder 59 is shut off. At the same time land 125 has been moved to uncover the escape port 118 in the cylinder 90 and also the outlet port 113. Bearing in mind that the outlet port 118 communicates with the escape passage 106' which in turn vents to the intake of the pump E to passage 106'', pressure is accordingly vented from the cylinder 59 by way of conduit 12. With the pressure vented from cylinder 59 the brake band 51 is released. In this third position the escape port 119 from cylinder 90 into passage 106' and the port 114 are both left open so that cylinder 48 is still vented by the way of conduit 143 through the port 114, the escape port 119, the passageways 106' and 106'' to the intake side of the pump E and accordingly the brake B is in its same condition as it was when second speed was established. However, the land 127 has moved to uncover the port 116 and close the port 110, therefore, pressure from the passageway 106 in the cylinder 90 is shut off to the space between lands 127 and 128A. Also this space is placed in communication through vent 121 with the escape passageway 106' and by the passageway 106'' with the intake side of the pump E. This space also communicates through port 116 with the passageway 106''' and thence by this passageway through passage 104' to the groove 165 in the valve 158'. This groove communicates with passage 162 leading to the cylinder 27 and therefore, the cylinder 27 controlling the clutch A is vented. Under these circumstances the clutch A may again become engaged.

In this third position of the valve stem 124' and its associated parts, the land 128 has been moved to uncover the port 111 and leave uncovered the port 117. Therefore, the pump pressure in cylinder 88 delivered by passage 96' to passage 106 will pass through the cylinder 90, out the port 117 and by way of conduits 145 and passages 146 and 147 to the clutch D. This effects an engagement of clutch D and with clutch A and D engaged a direct drive or third speed is established in the manner heretofore described.

As the speed of the engine and consequently the speed of the vehicle is further accelerated by the manipulation of the accelerator pedal the weights 99 of the governor move still further outward to their extreme outward position thus moving the valve 97 to its fully closed position. This shuts off any escape of oil from the pump E and consequently full oil pressure is delivered from the pressure chamber 88 through the passageway 96' to the left-hand end of the valve cylinder 90. Accordingly this increased pressure will move the valve stem 124' and its associated parts against the pressure exerted in the right-hand end of the valve cylinder 90 to its extreme right-hand position. At this point the piston member 129' abuts against the end of the cylinder 90 and in view of the fact that the land 128 abuts the piston member 129', the valve stem 124' and its associated parts is brought to rest in fourth control position. When the valve stem and its associated parts are moved to this fourth position the land 125 is moved to uncover port 113 and also outlet port 118. This outlet port 118, communicating with passageway 106' and passageway 106" vents that port of the cylinder 90 between the lands 124 and 125 to the intake side of the pump. In view of the fact that port 113 is in communication with cylinder 59 by way of conduit 142, this cylinder 59 is vented and accordingly the brake C is released. At the same time, with the valve stem 124' in its fourth position, the port 114 is uncovered by land 126 but the escape ports 118 and 119 are covered. Likewise inlet port 108 is uncovered so that pressure delivered from the cylinder 88 through the passage 96' to the passage 106 will pass from this passage 106 through the cylinder 90 between lands 125 and 126 and out through the port 114 and thence by the way of conduit 143 to cylinder 48, thereby engaging the brake band 40 of the brake B.

In this fourth position port 116 from passage 106" is uncovered and port 110 is likewise uncovered while escape ports 121 and 122 are covered. Therefore, oil under pressure from the pressure cylinder 88 passing by the way of passage 96' and passage 106 will pass through port 110 to the interior of the cylinder 90 between the lands 126A and 127 and out through port 116 to passageway 106''' and from this passageway by passageway 104', the groove 165 in valve 158' and passageway 162 to the cylinder 27. With pressure exerted in cylinder 27 the clutch A is disengaged.

Furthermore with the valve 124' in this fourth position the land 128 will uncover port 111 leading from passageway 106 to the interior of the cylinder 90 and port 117 leading by the way of conduit 143 to the clutch D. Therefore, oil under pressure delivered from the pressure chamber 88 through the passageway 96' to the passageway 106 will pass through the cylinder 90 between the lands 127 and 128 and out through port 117 and thus as heretofore explained, by the way of conduit 145 to clutch D. This energizes clutch D. Thus with brake C released, clutch A released, and brake B engaged, and clutch D engaged, fourth speed, generally spoken of as the overdrive speed, will be established in the manner heretofore described.

With the transmission in a given speed, there are occasions when it is desirable to obtain an increased torque on the driven shaft, such for instance as might be transmitted by a lower gear. It is also desirable to do this without slowing down the vehicle to the point where the centrifugal governor will effect a shift down. To this end, I provide a means for causing the fluid pressure on the right hand end of the cylinder 90 of the fluid shift control valve stem 124' to become preponderant over that on the left hand end, thus forcing the control valve member including the valve stem 124' and its associated lands to be shifted to the left (Figs. 8 and 11) to the point where the lower speed will be established through the control valve. It will be remembered that I provide a relief valve 153 which is maintained in a closed position, under the influence of a spring 154, which spring is so adjusted as to maintain the correct balance of pressure at the opposite ends of the control valve cylinder 90. If, therefore, the tension of this spring is increased to a sufficient extent, the valve 153 will be maintained closed against any surge of fluid under pressure from the fluid pump E. Accordingly, I have provided the cam 156 operating on the stop member 155 and manipulated by the lever 157. Therefore, with the lever so connected with the accelerator pedal controlling the throttle of the engine that the lever will be operated after the wide open throttle effect is produced, or in other words, it is operated beyond the normal range of operation of the throttle, when the throttle is moved beyond this normal range, the stop member 155 will be depressed, greatly increasing the tension or pressure in the right hand side of the fluid control valve cylinder 90, resulting in a surge of pressure against the pistons or stops 129', 129 and 130 which will move the fluid control valve stem to the left, thereby effecting a down shift.

It is obvious that there are periods when the transmission should be placed in neutral so that irrespective of the speed of the engine, power from the engine shaft will not be delivered to propel the vehicle. To effect this setting of the transmission in neutral the handle 170 of the valve member 158' is moved to the position marked N as indicated on dotted lines Fig. 10. In this Fig. 10 position for reverse drive as indicated at R, the position for high speed drive is indicated at H and the position for low speed drive is indicated at L.

With the valve member 158' rotated to the position illustrated in Fig. 10 pressure from the pressure chamber 88 passing by the way of passage 103 will be delivered to the left-hand end of the valve casing 159. With the valve member 158' in its neutral position the passageway 164 in the valve member 158' will be placed in communication with the passageway 162. Passageway 162 being connected with the cylinder 27 pressure will therefore, be admitted to the cylinder 27 and acting against piston 26 will prevent the clutch A from engaging irrespective of the speed at which the engine may be driven. At the same time port 168 will be placed in communication with passageway 160 leading to the cylinder 76 so that the cylinder 76 will be vented and there will be no pressure exerted to operate the reverse drive member 74. Accordingly the reverse drive is quiescent. At the same time groove 163 in the face of the valve member 158' is moved out of communication with the passageway 104 shutting off the supply of oil pressure to the passageway 106 in the valve cylinder 90 and accordingly there can be no oil pressure for the operation of the brakes B and C and clutch D delivered to this valve cylinder 90. Also port 167 in the valve member 158' is placed in communication with the passageway 104 and as a result the passageway 106 in the valve cylinder 90 is vented through the port 167 into the center opening 160' of the valve member 158'. This center opening at the right-hand end of the valve member 158', vents into the transmission casing so that the clutch D and cylinders operating the brakes B and C are vented and as a result no pressure can exist in these parts. Therefore, irrespective of any position to which the valve stem 124' might be moved there would be no delivery of oil under pressure to operate the clutch D and the brake bands B and C and with the clutch A here disengaged by the pressure exerted in the cylinder 27 the transmission will remain in neutral.

In order to effect reverse drive of the vehicle through the transmission the valve handle 170 of valve member 158' is moved to the extreme left-hand position indicated at R, Fig. 10. This then rotates the valve member 158' until the passageway 163 in the valve member 158' is placed in communication with the passageway 160 which communicates, as shown in Fig. 11, with the cylinder 76 of the reverse drive dog 74. Therefore, pressure from the pressure cylinder 88 will pass by the way of passage 103 and the passageway 163 in the valve member 158' to the passage 160 and pressure will be admitted to the reverse drive cylinder 76 causing the reverse drive dog 74 to engage to effect a reverse drive in the manner heretofore described. At the same time this passageway 163 will have been moved out of communication with the passageway 104 so that no pressure from the pressure cylinder 88 will be delivered to the passageway 106 and thence into the cylinder 90. Therefore, no operating pressure can be delivered to the brakes B and C or to the clutch D. Also the port 166 will be placed in communication with the passageway 104 so that any pressure in the passageway 106 of the valve casing 90 will be vented as this port 166 communicates with the center opening 160' of the valve member 158' which as heretofore described vents into the transmission casing. The passageway 162 leading from the pressure cylinder 27 is placed in communication with the passageway 104' by the way of groove 165 in the valve member 158' and as this passageway 104' communicates with the passageway 160''', which passageway may vent through the port 115 and the port 120 into passageways 106' and 106'', the cylinder 27 is vented thereby permitting clutch A to engage. Furthermore the cylinder 48 of brake B is vented by the way of conduit 143 and port 114 into the cylinder 90 and thence by port 119 to the vent passageways 106' and 106''. Likewise the clutch D is vented by conduit 145 through port 117 in valve casing 90 and vent port 122 through the vent ports 160' and 160''. Furthermore the cylinder 59 of brake C is vented by the way of conduit 141 through port 112 in cylinder 90 and through port 107 into passageway 106, which in turn is vented, as heretofore described, through passageway 104, port 166 in valve member 158' and thence by passage 160' to the transmission casing. Therefore, with the reverse drive dog 74 engaged and clutch A permitted to engage reverse drive will be effected.

There are times when it is desirable to maintain the transmission gearing at low speed drive irrespective of the speed of the engine. This may occur when the engine is used for braking purposes as when descending a hill. When it is desired to so maintain this low or first speed drive, the hand control lever 170 is moved to the right (Fig. 10) until it reaches the position indicated by L. Under these circumstances the extension 158'' on the rotatable valve member 158' will engage the member 156 causing this member to rotate and depress the stop 155. This increases the pressure exerted by the spring 152 on the ball valve 153 thereby preventing the escape of fluid under pressure from the valve cylinder 90. Therefore, pressure in the right hand side of the valve cylinder 90 can build up to such an extent that it will more than overcome any pressure admitted to the left-hand side of the valve cylinder 90 from pressure cylinder 88 by the way of port 96'. With the pressure in the right-hand end of the valve cylinder 90 predominating the valve stem 124' and its associated parts will be maintained in its first or low speed position irrespective of any increased speed in the speed of the engine.

With the control lever 170 moved to the position L, as illustrated in Fig. 10, the connections between passages 103 and 104 will not be materially disturbed and instead of the passage 160 venting through the port 169 in the valve member 158' it will vent through the passage 169 in said valve member 158' so that the passage of fluid pressure and the venting of fluid pressure to the valve parts will remain the same as they would with the valve member 170 in the position H or "high," as illustrated in Figs. 10 and 11.

As heretofore described down shift from fourth speed of the transmission may be effected by operating the control lever 157. By the proper manipulation of lever 157 the pressure of spring 152 may be increased through engagement of the cam 156 with the member 155. Increased pressure of spring 152 increases the resistance to the opening of the ball valve 153. This accordingly will cause a pressure to build up in the right-hand end of cylinder 90. This pressure will be increased until it overcomes the opposing pressure in the left-hand end of cylinder 90 which pressure have moved the stem 124' to its extreme right-hand position when the transmission is in "high" speed gear.

For effecting the above described movement of lever 157 I provide a connection between the accelerator pedal of the engine and the lever 157. Such a connection is illustrated more or less diagrammatically in Fig. 14. As illustrated in Fig. 14 the accelerator pedal 171 which controls the throttle valve of the engine is connected by a link and cam connection 172 with an operating rod 173 in turn connected to one end of a rocking lever 174, the opposing end of which is connected by the rod 175 with the throttle 176 of the engine. This rod 173 is jointed and interposed between the joints is a spring 177 which permits a continued movement of the rod 173 after the throttle of the engine is moved to fully opened position. Secured on the rod 173 is a collar 178 adapted to engage the lever 157. This collar 178 is so spaced with respect to the lever 157 that it will not engage the lever 157 until after the throttle 176 has been moved to wide open position. After the throttle 176 has been moved to wide open position, the spring 177 will permit the rod 173 to be moved by the operation of the throttle lever 171 past wide open position. When the throttle lever 171 moves past wide open position it moves the collar 178 into engagement with the lever 157 effecting the operation of the lever 157. It is to be observed therefore, that the throttle control lever 171 has a normal range of movement from fully closed to wide open and a range beyond wide open in which said second range effects the movement of the valve lever 157.

I claim as my invention:

1. In a transmission, in combination, a rotatable driving structure and a rotatable driven structure, a gearing unit for effecting a drive from said driving structure to said driven structure, including a pinion cage, a ring gear drivingly associated with said driven structure, a first set of pinion gears carried by said pinion cage and meshing with said ring gear, a second set of pinion gears carried by said pinion cage and meshing with said first set of pinion gears, a first sun gear meshing with said first set of pinion gears, a second sun gear meshing with said second set of pinion gears, a first clutch for effecting a drive from said driving structure to said first sun gear, a brake for holding said second sun gear against rotation, and a second clutch for connecting said driving structure with said pinion cage, means for effecting the engagement of said first clutch; fluid pressure operated means for operating said brakes and said second clutch, and for effecting a release of said first clutch, and means driven from either said driving structure or from said driven structure for supplying fluid pressure to said fluid pressure operated means.

2. In a transmission, in combination, a rotatable driving structure and a rotatable driven structure, a gearing unit for effecting a drive from said driving structure to said driven structure including a pinion cage, a ring gear drivingly associated with said driven structure, a first set of pinion gears carried by said pinion cage and meshing with said ring gear, a second set of pinion gears carried by said pinion cage and meshing with said first set of pinion gears, a first sun gear meshing with said first set of pinion gears, a second sun gear meshing with said second set of pinion gears, a first clutch for effecting a drive from said driving structure to said first sun gear, a first brake for holding said first sun gear against rotation, a second brake for holding said second sun gear against rotation, a second clutch for connecting said driving structure with said pinion cage, means for effecting an engagement of said first clutch, fluid pressure means for effecting the release of said first clutch and the operation of said second clutch and said brakes, and means responsive to the speed of at least one of said driving and driven structures for controlling the admission of fluid pressure to said fluid pressure operated means.

3. In a transmission, in combination, a rotatable driving structure and a rotatable driven structure, a gearing unit for effecting a drive from said driving structure to said driven structure including a pinion cage, a ring gear drivingly associated with said driven structure, a first set of pinion gears carried by said pinion cage and meshing with said ring gear, a second set of pinion gears carried by said pinion cage and meshing with said first set of pinion gears, a first sun gear meshing with said first set of pinion gears, a second sun gear meshing with said second set of pinion gears, a first clutch for effecting a drive from said driving structure to said first sun gear, a first brake for holding said first sun gear against rotation, a second brake for holding said second sun gear against rotation, and a second clutch for connecting said driving structure with said pinion cage, fluid pressure operated means for effecting the release of said first clutch and for actuating said second clutch and said brakes, and means responsive to the speed of one of said driving and driven structures for controlling the admission of operating fluid pressure to said fluid pressure operating means.

4. In a transmission, in combination, a rotatable driving structure, a rotatable driven structure, speed changing gearing for effecting a drive from said driving structure to said driven structure including a plurality of fluid pressure operated members for effecting a speed changing sequence through said speed changing gearing, a fluid pressure operated valve for controlling the admission of fluid pressure to said fluid pressure operated members sequentially, including a casing and a valve member reciprocably mounted in said casing, governor means responsive to the speed of at least one of said driving or driven structures and controlling the admission of fluid pressure to operate said valve member in one direction, means for admitting operating fluid pressure to said casing to bias said valve member in an opposite direction, and means for increasing the effective pressure for moving said valving means in the opposite direction after said valve member has moved a predetermined distance under the fluid pressure admitted through the operation of said governor means.

5. In a transmission, in combination, a rotatable driving structure and a rotatable driven structure, speed changing gearing for effecting a drive from said driving structure to said driven structure including a plurality of fluid pressure operated members for effecting a speed changing sequence through said speed changing gearing, a fluid pressure operated valve for controlling the admission of fluid pressure to said fluid pressure operating means, including a casing and a valve member reciprocably mounted in said casing, governor means for controlling the admission of fluid pressure to said casing to move said valve member in one direction, means for admitting fluid pressure to said casing for biasing said valve member in the opposite direction, means for maintaining said biasing fluid pressure constant and means for increasing the biasing effect of said pressure in said casing after said valve member has moved a predetermined distance under the admission of fluid pressure to said casing by said governor.

6. The invention set forth in claim 5 with the addition that one end of said valve member is exposed to the biasing pressure, a collar surrounding said valve member and having one face exposed to biasing pressure, and a lost-motion connection between said member and collar.

7. In a transmission, in combination, a rotatable driving structure and a rotatable driven structure, a gearing unit for effecting a drive from said driving structure to said driven structure including a pinion cage, a ring gear drivingly associated with said driven structure, a first set of pinion gears carried by said pinion cage and meshing with said ring gear, a second set of pinion gears carried by said pinion cage and meshing with first set of pinion gears, a first sun gear meshing with said first set of pinion gears, a second sun gear meshing with said second set of pinion gears, a releasable speed responsive coupling engageable to drive said first sun gear from said driving structure in response to the speed of the driving structure, the degree of engagement of said coupling being modulated by the speed of the driving structure, control means energizable to effect disengagement of said coupling, a brake for holding said second sun gear against rotation, operating means for said brake, a clutch for connecting said driving structure with said pinion cage, operating means for said clutch, and means responsive to progressively increasing speed of at least one of said structures for controlling the operation of said operating and coupling control means to sequentially effect first the engagement of said brake, next the engagement of said clutch and the energization of said coupling control means to release said speed responsive coupling, and then the release of said second brake and the de-energization of the coupling control means to permit speed-modulated reengagement of said coupling.

8. In a power transmission, in combination, a rotatable driving structure and a rotatable driven structure, a gearing unit for effecting a drive from said driving structure to said driven structure, including a pinion cage, a ring gear drivingly associated with said driven structure, a first set of pinion gears carried by said pinion cage and meshing with said ring gear, a second set of pinion gears carried by said pinion cage and meshing with said first set of pinion gears, a first sun gear meshing with said first set of pinion gears, a second sun gear meshing with said second set of pinion gears, a releasable speed responsive coupling engageable to drive said first sun gear from said driving structure in response to the speed of the driving structure, the degree of engagement of said coupling being modulated by the speed of the driving structure, a first brake for holding said first sun gear against rotation, a second brake for holding said second sun gear against rotation, a clutch for connecting said driving structure with said pinion cage, operating means respectively for said coupling and said clutch and for said first and second brakes, and means for controlling the operation of said operating means to effect the engagement of said second brake before said coupling is engaged; effect the release of said second brake while said clutch is still engaged and finally the engagement of said first brake while said second clutch is engaged to effect a drive of said driving structure through said gearing at progressively increasing speeds.

9. In a power transmission, in combination, a rotatable driving structure and a rotatable driven structure, a gearing for driving said driven structure from said driving structure at a multiplicity of speeds including a pinion cage, a ring gear drivingly associated with said driven structure, a first set of pinion gears carried by said pinion cage and meshing with said ring gear, a second set of pinion gears carried by said pinion cage and meshing with said first set of pinions, a first sun gear engaging said first set of pinion gears, a releasable speed responsive coupling engageable to drive said first sun gear from said driving structure in response to the speed of the driving structure, the degree of engagement of said coupling being modulated by the speed of the driving structure, control means energizable to effect disengagement of said coupling, a second sun gear engaging said second set of pinion gears, releasable holding means for holding said second sun gear against rotation, releasable means for drivingly connecting said pinion cage with said driving structure, means for operating said holding means, means for operating said releasable connecting means, and means for effecting the operation of said control and operating means to provide various speed drives from said driving structure to said driven structure through said gearing.

10. The invention set forth in claim 9 with the addition that the last named means is responsive to the speed of the driven structure.

11. The invention set forth in claim 10 with the addition that said holding means and releasable means are fluid-pressure operated.

12. In a power transmission, in combination, a rotatable driving structure and a rotatable driven structure, a gearing for driving said driven structure at a multiplicity of speeds and including a pinion cage, a ring gear drivingly associated with said driven structure, a first set of pinion gears carried by said pinion cage and meshing with said ring gear, a second set of pinion gears carried by said pinion cage and meshing with said first set of pinion gears, first gear means engaging said first set of pinion gears, a releasable speed responsive coupling engageable to drive said first gear means from said driving structure in response to the speed of the driving structure, the degree of engagement of said coupling being modulated by the speed of the driving structure, and fluid pressure operated control means for effecting disengagement of said coupling, second gear means engaging said second set of pinion gears, releasable holding means for holding said second gear means against rotation, releasable means for drivingly connecting said pinion cage with said driving structure, fluid pressure operated means for operating said releasable gear-holding means, fluid pressure operated means for operating said releasable connecting means, valving means for controlling the admission of fluid pressures to said fluid pressure operated means, and means responsive to the speed of the driven structure for controlling the operation of said valving means for effecting the operating of said fluid pressure operated means to provide various speed drives from said driving structure to said driven structure.

13. In a power transmission, in combination, a rotatable driving structure and a rotatable driven structure, a gearing for effecting a drive from said driving structure to said driven structure including a pinion cage, a ring gear drivingly associated with said driven structure, a first set of pinion gears carried by said pinion cage, and meshing with said ring gear, a second set of pinion gears carried by said pinion cage and meshing with said first set of pinion gears, a first sun gear meshing with said first set of pinion gears, a second sun gear meshing with said second set of pinion gears, a releasable speed responsive coupling engageable to drive said first sun gear from said driving structure in response to the speed of the driving structure, the degree of engagement of said coupling being modulated by the speed of the driving structure, control means energizable to disengage said coupling, a first brake for holding said first sun gear against rotation, means for operating said first brake, a second brake for holding said second sun gear against rotation, means for operating said second brake, a clutch for drivingly connecting said pinion cage with said driving structure, operating means for said clutch, means for effecting the operation of said second brake, operating means for rendering said second brake effective while said coupling is engaged to effect one speed drive between said driving and driven structures; for effecting the operation of said clutch operating means to cause the engagement of said second clutch and for energizing said control means to cause disengagement of said coupling while said second brake is holding to effect a second speed drive between the said driving and driven structures; for effecting the operation of said second brake operating means to cause release of said second brake for deenergizing said control means, and for effecting the operation of said second clutch operating means to cause engagement of said clutch to provide a direct drive between said driving and driven structures; for energizing said control means and for effecting the operation of the operating means for said first brake to cause said brake to hold said first sun gear against rotation while said second brake remains disengaged and said clutch remains engaged to effect an overdrive between said driving and driven structures; braking means for said pinion cage and means for operating said braking means to hold said pinion cage against movement while said coupling is operative to effect a reverse drive of said driven structure to said driving structure.

14. In a power transmission, in combination, a rotatable driving structure and a rotatable driven structure, a gearing for effecting a drive from said driving structure to said driven structure including a pinion cage, a ring gear drivingly associated with said driven structure, two sets of pinion gears carried by said cage, one of said sets drivingly engaging the ring gear and the other set drivingly engaging the first set, sun gears respectively engaging the pinions of each set, a releasable speed responsive coupling engageable to drive one of said sun gears from the driving structure in response to the speed of the driving structure, the degree of engagement of said coupling being modulated by the speed of the driving structure, and control means for effecting disengagement of said coupling, a clutch for connecting the pinion cage with the driving structure, a brake for each of said sun gears and fluid pressure operated means respectively for said coupling control means and said clutch and each of said brakes, and means for controlling the admission of fluid pressure to each of said fluid pressure operated means for effecting the operation of said coupling, clutch and brakes.

15. In a power transmission, in combination, a rotatable driving structure and a rotatable driven structure, a gearing for effecting a drive from said driving structure to said driven structure including a pinion cage, a ring gear drivingly associated with said driven structure, two sets of pinion gears carried by said cage, one of said sets drivingly engaging the ring gear and the other set drivingly engaging the first set, sun gears respectively engaging the pinion of each set, a releasable speed responsive coupling engageable to drive one of said sun gears from said driving structure in response to the speed of the driving structure, the degree of engagement of said coupling being modulated by the speed of the driving structure, and control means for effecting disengagement of said coupling, a clutch for connecting the pinion cage with the driving structure, a brake for one of said sun gears, fluid pressure operated means respectively for said coupling control means and said clutch and said brake, means for controlling the admission of fluid pressure to each of said fluid pressure operated means for effecting the operation of said clutch, coupling and brake, a brake for said pinion cage and fluid pressure operated means for operating said last named brake.

16. In a power transmission, a rotatable driving structure, a rotatable driven structure, relatively slow speed driving means for driving the driven structure from the driving structure, relatively fast speed driving means for driving the driven structure at a speed ratio faster than that provided by said slow speed driving means, fluid pressure operated means for effecting the driving shift of said driving means from said relatively slow speed drive to said relatively fast speed drive, a pump for supplying fluid pressure to said fluid pressure operated means, a gearing for driving said pump including a first gear, a rotatable support for said first gear driven with said driven structure and a second gear driven from said driving structure drivingly engaging said first gear.

17. In a power transmission, a rotatable driving structure, a rotatable driven structure, relatively slow speed driving means for driving the driven structure from the driving structure, relatively fast speed driving means for driving the driven structure at a speed ratio faster than that provided by said slow speed driving means, fluid pressure operated means for effecting the driving shift of said driving means from said relatively slow speed drive to said relatively fast speed drive, a pump for supplying fluid pressure for operating said fluid pressure operated means, a gearing for driving said pump including a first gear, a support for said gear rotatable with one of said structures and a second gear rotatable with the other of said structures driving said first gear.

18. In a power transmission, a rotatable driving structure, a rotatable driven structure, a relatively slow speed driving means for driving said driven structure from said driving structure, a relatively fast speed driving means for driving said driven structure from said driving structure at a speed ratio faster than that provided by the slow speed driving means, fluid pressure operated means for effecting a shift from one driving means to another driving means, a pump for supplying fluid pressure to said fluid pressure operated means and gearing for driving said pump including a first gear, a support for said gear rotatable with one of said structures and a second gear rotatable with the other of said structures driving said first gear.

19. In a transmission, relatively rotatable driving and driven members, planetary gearing for operatively interconnecting said members at any of a plurality of different speed ratios, said gearing including a rotatable element which is held stationary against a reaction torque in one direction when the gearing provides a connection of one speed ratio and which tends to rotate in the opposite direction when the gearing provides a connection of another speed ratio, means controlling said gearing to select the speed ratio of the connection it provides, said means including a brake associated with said member, a fluid-pressure motor for actuating said brake to hold said member stationary, and means responsive to the reaction torque applied to said element for controlling the release of pressure-fluid from said motor.

20. In a transmission, relatively rotatable driving and driven members, planetary gearing for operatively interconnecting said members at any of a plurality of different speed ratios, said gearing including a rotatable element which is held stationary against a reaction torque in one direction when the gearing provides a connection of one speed ratio and which tends to rotate in the opposite direction when the gearing provides a connection of another speed ratio, means controlling said gearing to select the speed ratio of the connection it provides, said means including a brake associated with said member, a fluid-pressure motor controlling said brake, and means responsive to the torque applied to said element for affecting operation of said motor.

21. In a transmission, relatively rotatable driving and driven members, planetary gearing for operatively interconnecting said members at any of a plurality of different speed ratios, said gearing including a rotatable element which is held stationary against a reaction torque in one direction when the gearing provides a connection of one speed ratio and which tends to rotate in the opposite direction when the gearing provides a connection of another speed ratio, means controlling said gearing to select the speed ratio of the connection it provides, said means including a first brake member rotatable with said element and a second brake member having a limited freedom of rotative movement, brake-actuating means for forcing said two brake members into engagement, and means responsive to movement of said second brake member within its range of movement for controlling release of said brake-actuating means.

22. In a transmission, relatively rotatable driving and driven members, planetary gearing for operatively interconnecting said members at any of a plurality of different speed ratios, said gearing including a rotatable element which is held stationary against a reaction torque in one direction when the gearing provides a connection of one speed ratio and which tends to rotate in the opposite direction when the gearing provides a connection of another speed ratio, means controlling said gearing to select the speed ratio of the connection it provides, said means including a brake associated with said member, a fluid-pressure motor for actuating said brake to hold said member stationary, a relief passage communicating with said motor to permit the escape of fluid therefrom and consequent release of the brake, two serially located valves in said passage, and means responsive to the reaction torque applied to said element for controlling one of said valves.

WILLIAM B. BARNES.

References Cited in the file of this patent

UNITED STATES PATENTS

| Number | Name | Date |
|---|---|---|
| 752,953 | Brush | Feb. 23, 1904 |
| 944,597 | Brush | Dec. 28, 1919 |
| 1,609,782 | Small | Dec. 7, 1926 |
| 1,894,890 | Rossi | Jan. 17, 1933 |
| 2,013,126 | Bonn | Sept. 3, 1935 |
| 2,045,612 | Padgett | June 30, 1936 |
| 2,220,174 | Ravigneaux | Nov. 5, 1940 |
| 2,221,393 | Carnegie | Nov. 12, 1940 |
| 2,223,716 | Bojesen | Dec. 3, 1940 |
| 2,251,625 | Hale | Aug. 5, 1941 |
| 2,278,351 | Havens et al. | Mar. 31, 1942 |
| 2,402,248 | Hale | June 18, 1946 |
| 2,516,208 | Hasbany | July 25, 1950 |

FOREIGN PATENTS

| Number | Country | Date |
|---|---|---|
| 443,735 | Great Britain | Mar. 5, 1936 |
| 372,692 | France | Apr. 13, 1907 |